(12) United States Patent
Pinkley et al.

(10) Patent No.: US 12,506,375 B2
(45) Date of Patent: Dec. 23, 2025

(54) SYSTEM AND METHOD OF DISCHARGING ROTOR VOLTAGE

(71) Applicant: Rivian IP Holdings, LLC, Plymouth, MI (US)

(72) Inventors: Gary Allen Pinkley, Northville, MI (US); Lon C Cooper, Redondo Beach, CA (US); Chao Wang, Ann Arbor, MI (US)

(73) Assignee: Rivian IP Holdings, LLC., Irvine, CA (US)

( * ) Notice: Subject to any disclaimer, the term of this patent is extended or adjusted under 35 U.S.C. 154(b) by 345 days.

(21) Appl. No.: 18/173,273

(22) Filed: Feb. 23, 2023

(65) Prior Publication Data
US 2024/0291335 A1    Aug. 29, 2024

(51) Int. Cl.
| | | |
|---|---|---|
| *H02K 11/40* | (2016.01) | |
| *H02K 1/2706* | (2022.01) | |
| *H02K 1/32* | (2006.01) | |
| *H02K 5/124* | (2006.01) | |
| *H02K 7/00* | (2006.01) | |

(52) U.S. Cl.
CPC ............. *H02K 1/32* (2013.01); *H02K 1/2706* (2013.01); *H02K 5/124* (2013.01); *H02K 7/003* (2013.01)

(58) Field of Classification Search
CPC ........ H02K 11/40; H02K 1/32; H02K 1/2706; H02K 5/124; H02K 7/003; H02K 9/00; H02K 9/197; H02K 1/28; H02K 1/2786
USPC .......................................................... 310/54
See application file for complete search history.

(56) References Cited

U.S. PATENT DOCUMENTS

| | | | | |
|---|---|---|---|---|
| 5,211,406 A | * | 5/1993 | Katzensteiner | F16J 15/3256 277/572 |
| 6,860,486 B2 | * | 3/2005 | Hacker | F16J 15/3228 277/560 |
| 2001/0017495 A1 | * | 8/2001 | Sato | H02K 5/161 310/67 R |
| 2003/0030333 A1 | * | 2/2003 | Johnsen | H02K 1/32 310/54 |
| 2010/0127585 A1 | * | 5/2010 | Fee | H02K 11/40 310/71 |

(Continued)

FOREIGN PATENT DOCUMENTS

| | | | |
|---|---|---|---|
| CN | 209805062 U | * | 12/2019 |
| CN | 115126782 A | * | 9/2022 |

(Continued)

OTHER PUBLICATIONS

Machine Translation of JP 2006057825 (Year: 2006).*

(Continued)

*Primary Examiner* — Christopher M Koehler
*Assistant Examiner* — David Owen Johnson
(74) *Attorney, Agent, or Firm* — Foley & Lardner LLP

(57) ABSTRACT

Systems and method to control rotor voltage of a liquid cooled motor are provided. A system can include a rotor, a shaft, and a ring. The ring can be disposed on the shaft. The ring can include a first lip in contact with an inner surface of the rotor and a second lip in contact with the inner surface of the rotor and a cooling liquid. The first lip can provide an (Continued)

electrical path to discharge a voltage from the rotor. The second lip can provide a seal between the first lip and the cooling liquid.

20 Claims, 10 Drawing Sheets

(56) References Cited

U.S. PATENT DOCUMENTS

| | | | | |
|---|---|---|---|---|
| 2014/0203514 | A1* | 7/2014 | Colineau | F16J 15/3284 |
| | | | | 277/549 |
| 2016/0164378 | A1* | 6/2016 | Gauthier | H02K 9/19 |
| | | | | 310/54 |
| 2017/0104292 | A1* | 4/2017 | Chonan | H01R 13/5221 |
| 2018/0163872 | A1* | 6/2018 | Maskaliunas | F16J 15/002 |
| 2021/0180698 | A1* | 6/2021 | Wagner | F16J 15/3252 |
| 2022/0074498 | A1* | 3/2022 | Gildea | F16J 15/3256 |
| 2023/0007761 | A1* | 1/2023 | Shiraishi | H05F 3/02 |
| 2023/0025528 | A1* | 1/2023 | Brushkivskyy | H02K 13/003 |
| 2023/0402896 | A1* | 12/2023 | Blanchard St-Jacques | |
| | | | | H02K 3/50 |
| 2024/0097536 | A1* | 3/2024 | Zhou | H02K 11/40 |

FOREIGN PATENT DOCUMENTS

| | | | | |
|---|---|---|---|---|
| DE | 102016207672 A1 * | 11/2017 | | H02K 5/124 |
| DE | 102019217072 A1 * | 5/2021 | | |
| DE | 102021004802 A1 * | 3/2022 | | H02K 11/40 |
| DE | 102021117106 A1 * | 1/2023 | | |
| JP | 2006057825 A * | 3/2006 | | |
| KR | 20170061270 A * | 6/2017 | | F16H 57/0472 |

OTHER PUBLICATIONS

Machine Translation of KR 20170061270 (Year: 2017).*
Machine Translation of CN 209805062 (Year: 2019).*
Machine Translation of DE 102019217072 (Year: 2021).*
Machine Translation of DE 102021004802 (Year: 2022).*
Machine Translation of CN 115126782 (Year: 2022).*
Machine Translation of DE 102021117106 (Year: 2023).*
DE 102016207672 Machine Translation (Year: 2016).*
Helwig Carbon, Helwig Carbon's Bearing Protection System: The Industry's Best Motor Shaft Grounding Solution, 2023, https://www.helwigcarbon.com/shaft-grounding/ [accessed Feb. 23, 2023].
Morgan Advanced Materials, AEGIS Bearing Protection for VFD AC Motors, https://www.morganelectricalmaterials.com/en-gb/products/aegis-shaft-grounding-ring/aegis-bearing-protection-for-vfd-ac-motors/, [accessed Feb. 23, 2023].
Motion Drives, How Do Shaft Grounding Brushes Compare with AEGIS Rings?, May 28, 2020, https://motion-drives.com/blog/2020/05/28/how-do-shaft-grounding-brushes-compare-with-aegis-rings/ [accessed Feb. 23, 2023].

* cited by examiner

SYSTEM AND METHOD OF DISCHARGING ROTOR VOLTAGE

INTRODUCTION

A vehicle, such as an electric vehicle, can be powered by batteries. The vehicle can include a motor to drive the vehicle based on power provided by the batteries.

SUMMARY

An aspect of this disclosure is generally directed to techniques for discharging or grounding a rotor voltage. In an electric motor, torque generated by a rotor can create an internal voltage. The internal rotor voltage can build up over time and eventually discharge. The internal rotor voltage can discharge through metal components of the motor (e.g., bearings, splines, or gears) degrading the components. This component degradation can lead to degradation in performance of the electric motor, and increase noise, vibration, and harshness (NVH). Discharging rotor voltage or grounding a rotor in a liquid or oil cooled motor can include technical challenges. For example, components that contact the rotor to ground the rotor may not properly provide a low resistance path to ground if an oil film develops between the grounding components and the rotating rotor. To solve these and other technical problems, the present solution can include a grounding ring that grounds the rotor and prevents the internal rotor voltage from building up and discharging. The ring can be disposed on a shaft that the rotor rotates around. The ring can include lips or wipers that make an electrical contact with an inner surface of the rotor while the rotor rotates. The ring can include multiple lips. These lips can be stacked along a longitudinal axis of the rotor and the shaft. At least one outer lip can provide a seal to limit or prevent oil from coming into contact with at least one inner lip. The outer lips can prevent a buildup of oil on the inner lips which may ground the rotor. By preventing a buildup in oil, the outer lips can prevent an increase in resistance to the electrical or grounding path that the inner lip provides.

At least one aspect is directed to a system to control rotor voltage in a motor. The system can include a rotor, a shaft, and a ring. The ring can be disposed on the shaft. The ring can include a first lip in contact with an inner surface of the rotor and a second lip in contact with the inner surface of the rotor and a cooling liquid. The first lip can provide an electrical path to discharge a voltage from the rotor. The second lip can provide a seal between the first lip and the cooling liquid.

At least one aspect is directed to an apparatus. The apparatus can include a body with a cylindrical shape disposed on a shaft within a rotor of a motor. The apparatus can include a first lip in contact with an inner surface of the rotor. The apparatus can include a second lip in contact with the inner surface of the rotor and a cooling liquid. The first lip can provide an electrical path to discharge a voltage from the rotor. The second lip can provide a seal between the first lip and the cooling liquid.

At least one aspect is directed to a method. The method can include disposing a ring around a shaft. The method can include inserting the shaft into a cavity of a rotor. The method can include discharging a voltage from the rotor by a first lip of the ring in contact with an inner surface of the rotor, the first lip providing an electrical path to discharge the voltage. The method can include providing a seal between the first lip and a cooling liquid with a second lip in contact with the inner surface of the rotor.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for discharging voltage of a rotor of a motor, such as a motor of an electric vehicle.

This disclosure is generally directed to controlling (e.g., discharging) voltage of a rotor in wet-cooled motor, including for example techniques for discharging rotor voltage or grounding the rotor in an oil-cooled electric motor. In an electric driveline, torque generated by a rotor can create an internal rotor voltage. As used herein, rotor voltage or voltage of a rotor can mean a voltage generated by torque of a rotor. If a ground path resistance in the motor is too high (e.g., 5V, 10V, 15V, 20V, 50V, or higher), the internal rotor voltage can build up over time and eventually discharge. The internal rotor voltage may discharge through metal components of the motor (bearings, splines, or gears) to a ground. When the voltage reaches or exceeds a threshold, the discharge may, over time, degrade the performance of the electric motor, or cause or increase NVH.

This technical solution provides a wet-cooled environment (e.g., oil-cooled) for the electric motor that includes a ring that grounds or discharges voltage from the rotor. By grounding or discharging voltage from the rotor, this technical solution can prevent or mitigate the likelihood that the internal rotor voltage reaches or exceeds a threshold voltage. The ring can be disposed on a shaft around which the rotor rotates. The ring can include lips or wipers that make an electrical contact with an inner surface of the rotor while the rotor rotates. The ring can include multiple lips. These lips can be stacked along a longitudinal axis of the rotor and the shaft. At least one outer lip can provide a seal to limit or prevent oil from coming into contact with at least one inner lip. The outer lips can prevent a build-up of oil on the inner lips to prevent an increase in resistance to the electrical or grounding path that the inner lip provides.

Figure 1:
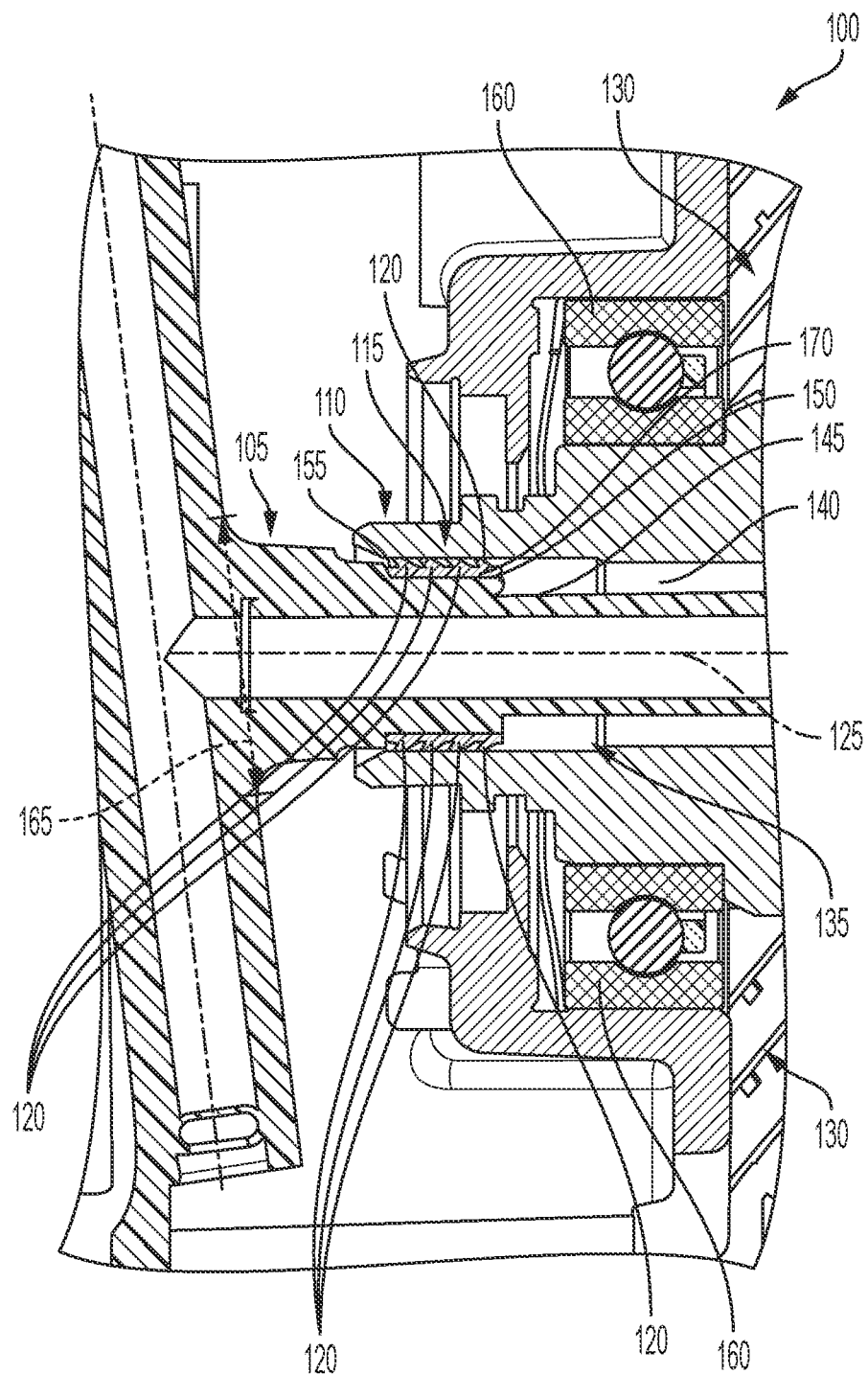
FIG. 1 is an example motor including a ring to discharge voltage from a rotor.

Referring to FIG. 1, among others, a motor 100 including a ring 115 disposed on a shaft 105 that controls (e.g., grounds or discharges) voltage from a rotor 110 is shown. FIG. 1 depicts a cross-sectional view of the motor 100. The rotor 110 can be a rotor 110 of an apparatus 100, such as a motor. The motor 100 can be a motor of an electric vehicle, such as an alternating current (AC) motor, a direct current motor (DC) motor, an electric driveline, or any other type of motor or drive component. The motor 100 can be a synchronous or asynchronous motor. The motor 100 can be powered by a battery pack, battery module, or battery cell of an electric vehicle. The motor 100 can operate to generate torque to drive the vehicle, e.g., cause the vehicle to drive forward, cause the vehicle to drive in reverse, or cause the vehicle to turn. The motor 100 can operate to perform a regenerative braking to use vehicle momentum to generate current to charge the battery pack, battery module, or battery of the vehicle. While the motor 100 is described as an electric motor of a vehicle, the apparatus 100 can be a motor, a clutch, a generator, a system, or any other component with a rotating rotor 110.

The motor 100 can include at least one bearing 160. The bearing 160 can include an inner diameter and an outer diameter. The bearing 160 can be a rolling bearing, a ball bearing, a plain bearing, a magnetic bearing, a fluid bearing, or any other type of bearing that can rotate around a longitudinal axis. The bearing 160 can couple to the rotor 110 and fix the rotor 110 to the motor 100. The rotor 110 can rotate around a longitudinal axis 125 via the bearings 160. For example, the rotor 110 can be inserted into an opening of the bearing 160 and make contact with an inner surface of the bearing 160. Rotation of the rotor 110 can cause an inner disc of the bearing 160 to spin, while an outer disc may be fixed to a wall of the motor 100 and may not spin relative to the rotation of the rotor 110.

The rotor 110 may include at least one magnet. The rotor 110 may not include any magnets. The motor 100 may be an induction motor or a permanent magnet based motor. In such examples, the magnets can be or include ferrite magnets, aluminum nickel cobalt magnets, samarium cobalt magnets, or neodymium iron born magnets. The motor 100 can include at least one stator 130. The stator 130 can surround the rotor 110. The stator 130 can be fixed or be stationary and may not rotate within the motor 100. The stator 130 can create a magnetic field around the rotor 110. For example, the stator 130 can create a magnetic field, based on power received from a battery pack, a battery module, or a battery cell. The rotor 110 can spin around a longitudinal axis 125 to align with the magnetic field created by the stator 130. For example, based on the magnets of the rotor 110, the rotor 110 can rotate to align with the magnetic field of the stator 130. The motor 100 can cause the magnetic field to rotate around the longitudinal axis 125 causing the rotor 110 to spin and generate torque to drive an axle of the motor 100. The axle can drive at least one wheel or other tractive component of the vehicle. For example, the axle can be coupled with a wheel or drive line to cause the wheel to spin.

The axle can, in some cases, rotate to cause the rotor 110 to rotate. The rotation of the rotor 110 can induce a magnetic field in the stator 130. For example, the motor 100 can perform regenerative braking causing momentum of the wheels of a vehicle to spin the rotor 110 and induce a magnetic field in the stator 130 causing current to flow in the stator 130. This energy can be stored in batteries of the vehicle. If the apparatus 100 is a generator, the axle can be driven by a windmill, or a turbine. The axle can drive the rotor 110 causing a magnetic field to be induced in the stator 130.

The rotor 110 can include a cavity 135. The cavity 135 can be a cylindrical shaped cavity with a circular inner surface 140. The inner surface 140 can be circular or oval shaped. The cavity 135 can include a longitudinal axis 125. A longitudinal axis 125 of the cavity 135 can be aligned with the longitudinal axis 125 of the rotor 110. At least one shaft 105 can extend through, or at least partially into, the cavity 135 of the rotor 110. The rotor 110 can spin or rotate around the shaft 105. The shaft 105 can be a pole, a rod, an axle, an inner bore rotor shaft. The shaft 105 can be fixed or stationary and may not move or rotate within the motor 100. The shaft 105 can be a cylindrical shaped shaft 105. An outer surface 145 of the shaft 105 can be circular or oval shaped. The outer surface 145 of the shaft 105 can have a diameter or radius less than a diameter or radius of the cavity 135 of the rotor 110 such that the shaft 105 can fit within the rotor 110 or so that the rotor 110 can rotate around the shaft 105 without contacting the shaft 105. The shaft 105 can extend from a first end or wall of an enclosure, case, or housing of the motor 100 into the cavity 135 of the rotor 110. The shaft 105 can extend partially into or fully across the rotor 110 along the longitudinal axis 125.

The shaft 105 can include at least one grounding ring, ring, cylinder, band, halo, or disk 115. The ring 115 can be a cylindrical shaped component that is coupled, fixed, fixedly coupled, connected, or joined to the outer surface 145 of the shaft 105. The ring 115 can have an inner surface or side 150 that extends at least partially around the outer surface 145 of the shaft 105. The diameter or radius of the inner surface of the ring 115 can be the same as, slightly smaller, or slightly larger, than the diameter or radius of the outer surface 145 of the shaft 105. The ring 115 can be coupled to, connect with, contact with, or touch to, the shaft 105 through a frictional force between the inner side 150 of the ring 115 and the outer surface 145 of the shaft 105. The inner side 150 of the ring 115 can contact the outer surface 145 of the shaft 105. The ring 115 can have a diameter slightly (e.g., 1%, 2%, 3%, 4%, 5%, 10% or other percentage that facilitates disposing the ring 115 on the shaft 105 to provide a seal or discharge voltage from the rotor) smaller than a diameter of the shaft 105 and therefore the ring 115 can exert a spring force against the surface 145 of the shaft 105, frictionally fixing the ring 115 to the shaft 105. The ring 115 can be fixed to the shaft 105 with an adhesive, such as a conductive adhesive. The adhesive can be disposed between the side 150 of the ring 115 and the surface 145 of the shaft 105 and can bind, couple, or fix the ring 115 to the shaft 105. At least one washer, nut, connector, bolt, screw, or nail can fix the ring 115 to the shaft 105.

The ring 115 can be or include a flexible material. The material of the ring 115 can apply a force on the outer surface 145 of the shaft 105 and fixes the ring 115 to the shaft 105. The ring 115 can be or include a conductive material. The material can be or include a polymer (e.g., an intrinsically conducting polymer (ICP) such as polyacetylene, polyphenylene vinylene, polypyrrole, polythiophene, polyaniline, or polyphenylene sulfide), metal (e.g., copper, iron, gold, aluminum, silver), a metal spring, a conductive graphite, a conductive elastomer, a conductive carbon fiber, or other material. The material can further be non-conductive or include non-conductive elements such as plastic, rubber, or any other insulating material. The ring 115 can be electrically coupled, electrically connected, or in electrical contact with the shaft 105. For example, the side 150 of the ring 115 can touch the surface 145 of the shaft 105 electrically coupling or connecting the ring 115 and the shaft 105.

The ring 115 can include a body 170. The body 170 of the ring 115 can have a shape. The shape can be cylindrical. The body 170 can be a disc, a ring shape, a cylinder shape, or a hollow cylinder shape. The body 170 can extend radially from the longitudinal axis 125 of the ring 115 from the side 150 to the surface 155. The body 170 can include openings for the shaft 105 to extend through. The body 170 can include an inner cavity defined by the side 150. The inner cavity can have a shape. The shape can be cylindrical. The shape can be an octagonal prism. The shape can be a decagonal prism.

The ring 115 can include at least one contact surface, fin, edge, protrusion, component, wiper lip, sealing lip, or lip 120. The lips 120 can contact an inner bore rotor shaft 105. The ring 115 can include at least one lip 120. The ring 115 can include multiple rings 115 evenly or unevenly spaced along the longitudinal axis 125. At least one lip 120 can extend from the body 170 of the ring 115. At least one lip 120 can extend from an outer surface 155 of the ring 115 away from the outer surface 155 towards the surface 140 of the cavity 135. The lips 120 can contact the rotor 110 or the surface 140 of the rotor 110. The lips 120 can contact the rotor 110 or the surface 140 to ground the rotor 110. The lips 120 can make an electrical contact with the rotor 110 or the surface 140 of the rotor 110. The lips 120 can be electrically coupled with the rotor 110 or the surface 140 of the rotor 110. The lips 120 can be electrically connected to rotor 110 or the surface 140 of the rotor 110. The ring 115 can be a single component formed, molded, or cast from a single material or multiple materials. The ring 115 can be or include multiple pieces, parts, or components, such as an assembly of pieces. For example, the body 170 of the ring can be one piece while the lips 120 can each be separate pieces that fix, couple, or join to the body 170 via an adhesive, glue, a weld, a plastic, or any other connector.

The ring 115 can ground the rotor 110. The ring 115 can discharge a voltage generated within the motor 100. The ring 115 can discharge a voltage created by the rotor 110. For example, the ring 115 can provide a ground path, between the rotor 110 and a ground and thus discharge a voltage of the rotor 110. The ring 115 can electrically couple the rotor 110 to the shaft 105 to ground the rotor 110. For example, the shaft 105 can be electrically coupled to a frame of the vehicle thereby grounding the ring 115 and the rotor 110 or providing an electrical path from the rotor 110 to a ground. The electrical path can include the ring 115, one or more conductors, the shaft 105, wires, or other conducting components that couple the rotor 110 to a neutral or ground component, e.g., a vehicle frame or chassis. The shaft 105 can be electrically connected or coupled with a housing of the motor 100. In other examples, the ring 115 may be grounded via a conductive path separate from the material forming the shaft 105 (e.g., a conductive wire or path internal to the shaft 105 connected to the ring 115). The motor 100 can be installed on a frame of a vehicle and electrically coupled, connected, or joined to the frame. The frame can be or provide a ground for the vehicle. By electrically coupling the rotor 110 to the ring 115, the ring to the shaft 105, the shaft to the housing of the motor 100, and the housing of the motor 100 to the frame of the vehicle, the rotor 110 can be grounded. At least one conductive element, component, wire, trace, or other element can electrically ground the ring 115 or the shaft 105 to ground the rotor 110. Grounding or coupling a component to an electrical path, e.g., electrically coupling the rotor 110 to a ground, can include electrically coupling the component to another component that is electrically neutral or negative.

The lips 120 of the ring 115 can include inner lips 120 and outer lips 120. The outer lips 120, for example the lips 120 on the ends of the ring 115, can prevent, limit, or reduce an amount of a liquid (e.g., a cooling liquid) within the motor 100 from contacting the inner lips 120. For example, the outer lips 120 can keep the inner lips 120 free or at least partially free of the liquid. For example, the outer lips 120 can keep the inner lips 120 dry or at least partially dry of the liquid. The liquid can be a refrigerant or oil that cools internal components (e.g., the stator 130, the rotor 110, bearings 160, or any other heat generating component) of the motor 100. The oil can be or include a refrigerant oil, e.g., a mineral oil or a synthetic oil. The synthetic oil could be alkylbenzene, polyolester, polyalkylene glycol, polyvinyl ether. The oil can be pumped into or out of the motor 100. The oil can absorb heat generated by the rotating components of the motor 100, e.g., heat generated by the rotation of the rotor 110, the oil can be pumped out of the motor 100 to transfer the heat away from the motor and keep the internal components of the motor 100 cool. Because the motor 100 is oil cooled, the motor 100 can have better thermal performance and thus reduce any power limitations due to overheating of components.

Figure 2:
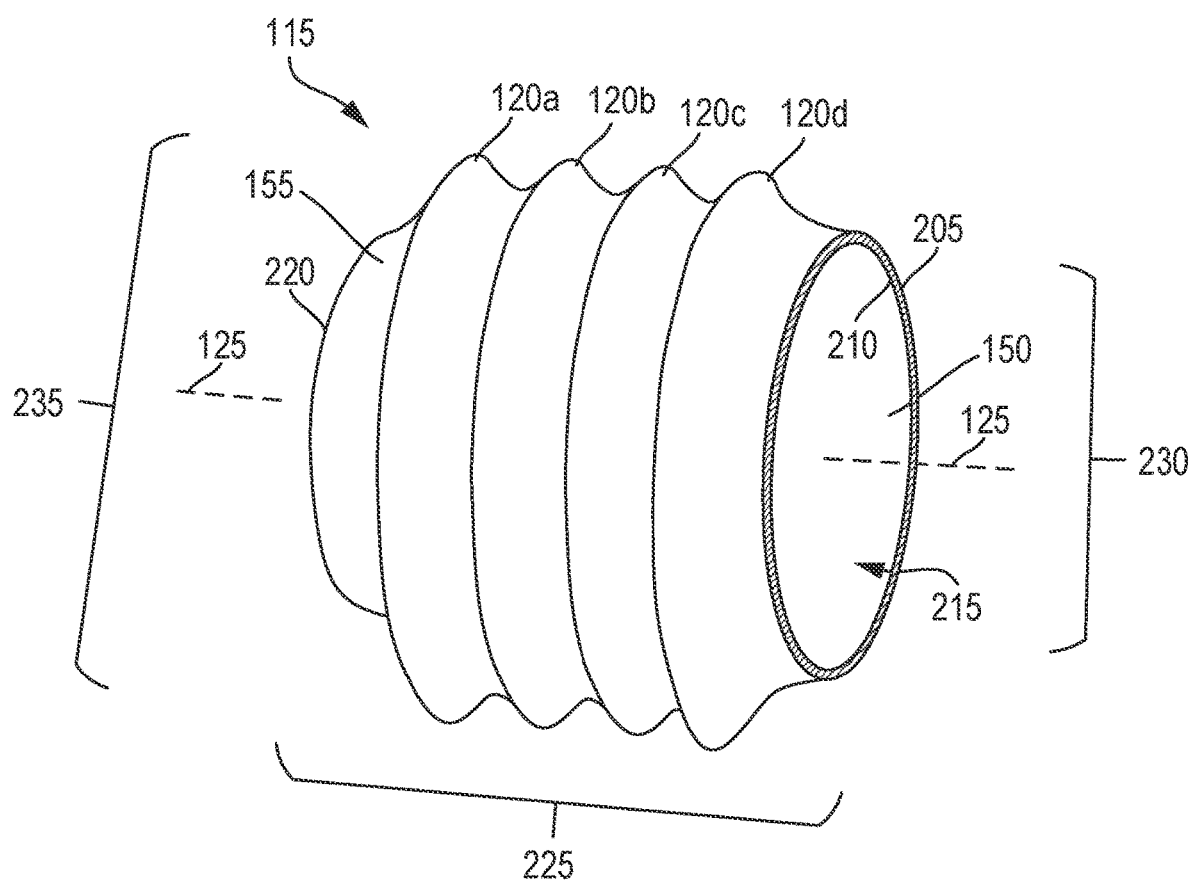
FIG. 2 is an example ring to discharge voltage from a rotor.

Referring to FIG. 2, among others, the ring 115 for grounding the rotor 110 or discharging rotor voltage is shown. FIG. 2 depicts an isometric view of ring 115. The ring 115 can be a cylindrical shaped component that fits around the shaft 105. The ring 115 can include a first opening 215 and a second opening 220. The openings 215 and 220 can be circular, oval shaped, curved, or a free form shape. The ring 115 can include an inner circumference, boundary, or area 210 and an outer circumference boundary, or area 205. The inner circumference 210 can define the inner surface 155. The outer circumference 205 of the shaft 105 can be the same size, slightly smaller, than an inner circumference of the shaft 105 such that the ring 115 can frictionally couple with the shaft 105. The lips 120 can extend away from the outer surface 155 or the longitudinal axis 125. The lips 120 can bend away from the opening 215 towards the opening 220. For example, the lips 120 can bend towards a wall of the motor 100 and away from the rotor 110. Because the lips 120 can be angled away from the rotor 110, when the ring 115 is inserted into the cavity 135 of the rotor 110, the lips 120 may not be bent or twisted and thus the lips 120 may not lose any integrity and apply a force or pressure against the surface 140 of the cavity 135.

The ring 115 can have a length 225, an inner width 230, and an outer width 235. The length 225 can be the distance that the ring 115 extends from end to end along the longitudinal axis 125. For example, the distance 225 can be a length between the first opening 215 and the second opening 220. The distance 225 can be nine to twelve millimeters long. The distance 225 can be five to fifteen millimeters long. The distance 225 can be less than five millimeters long. The distance 225 can be greater than fifteen millimeters long. The inner width 230 can be five to ten millimeters long. The inner width 230 can be three to twelve millimeters long. The inner width 230 can be less than three millimeters long. The inner width 230 can be greater than twelve millimeters long. The outer width 235 can extend between edges of the lips 120. For example, the outer width 235 can be a diameter of the outer edge of the lips 120. The outer width 235 can be eight to eleven millimeters wide. The outer width 235 can be five to fourteen millimeters wide. The outer width 235 can be less than five millimeters long. The outer width 235 can be greater than fourteen millimeters wide.

Figure 3:
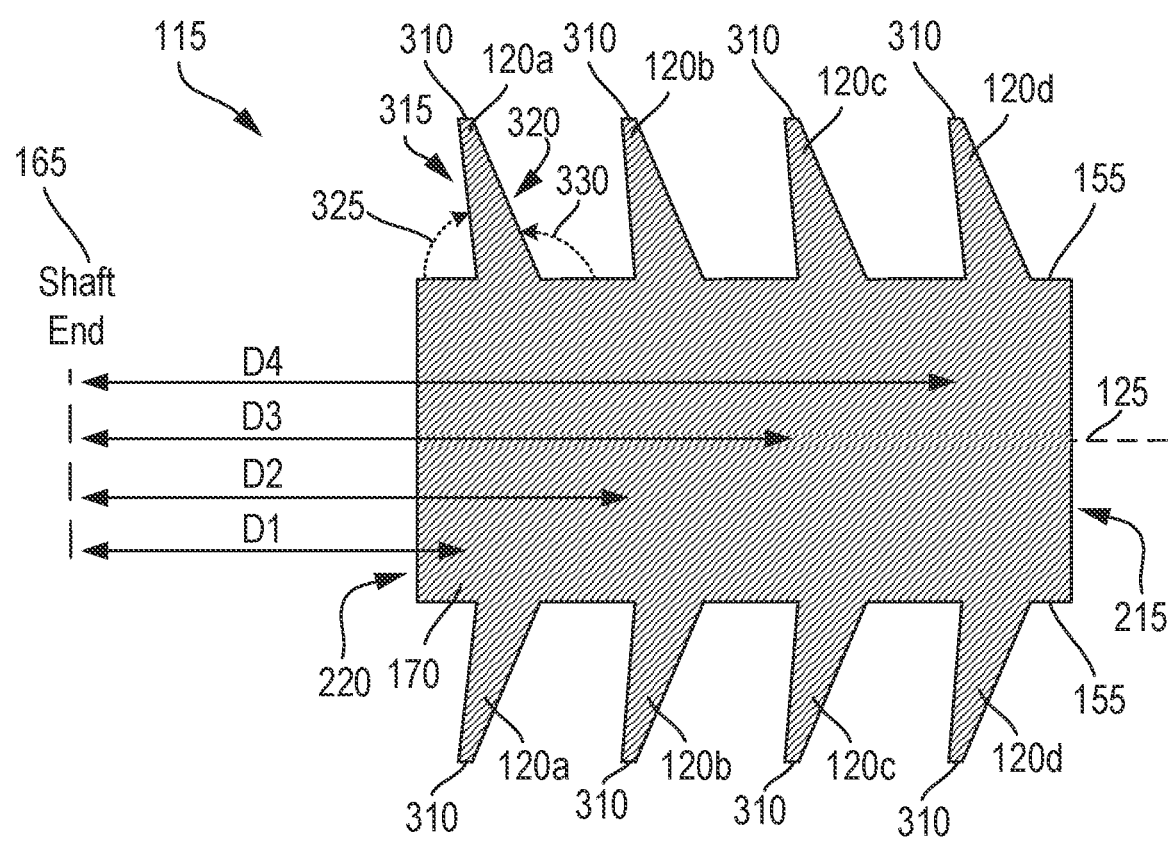
FIG. 3 is another example ring to discharge voltage from a rotor.

Referring to FIG. 3, among others, a ring 115 for grounding a rotor 110 or coupling the rotor 110 to an electrical path to ground is shown. FIG. 3 depicts a cross-sectional view of the ring 115. The ring 115 can include four lips 120. While the ring 115 is shown to include four lips 120, the ring 115 can include any number of lips. For example, the ring 115 can include two lips 120, e.g., a first lip 120a to limit liquid from coming into contact with a second lip 120b. As another example, the ring 115 can include three lips 120, a first lip 120a and a third lip 120c on either side of a second lip 120b that limit liquid from coming into contact with the second lip 120b. The ring 115 can include a fourth lip 120d that limits liquid from contacting the second lip 120b and the third lip 120c. The ring 115 can include an odd or even number of lips 120. The lips 120 in FIG. 3 are shown to be equally spaced from each other. However, the lips 120 can be unequally spaced along the longitudinal axis 125. For example, the lips 120 can be separated from each other by one, two, three, or any number of different distances.

A lip 120 can be positioned on the ring 115 a distance from an end 165 of the shaft 105. The end 165 is described in further detail, for example, at FIG. 7. The end 165 can be a point where the shaft 105 meets a wall of the motor 100. The lips 120 can each be positioned on the ring 115 along the longitudinal axis 125 a distance from the end 165 of the shaft 105. The first lip 120a can be positioned a first distance D1 from the shaft end 165. The second lip 120b can be positioned a second distance D2 from the shaft end 165. The second distance D2 can be greater than the first distance D1. However, the second distance D2 can be less than a third distance D3 and less than a fourth distance D4. A third lip 120c can be positioned a third distance D3 from the shaft end 165. The third distance D3 can be greater than the first distance D1 and greater than the second distance D2. However, the third distance D3 can be less than a fourth distance D4. The fourth lip 120d can be positioned a fourth distance D4 from the shaft end 165. The fourth distance D4 can be greater than the first distance D1, the second distance D2, and the third distance D3.

A lip 120 can include a first side 315 and a second side 320. The first side 315 and the second side 320 can extend from the outer side or surface 155 of the ring 115. The first side 315 and the second side 320 can extend radially away from the longitudinal axis 125 of the ring 115. The first side 315 can be angled towards the shaft end 165. For example, the first side 315 can extend from the surface 155 at an angle 325. The angle 325 can be an acute angle. The angle 325 can be less than ninety degrees. The angle 325 can be between seventy degrees and eighty degrees. The angle 325 can be between sixty-five and eighty-five degrees. The angle 325 can be between sixty degrees and ninety degrees. The angle 325 can be less than sixty-fix degrees. The angle 325 can be equal to or greater than ninety degrees. The second side 320 can form an angle 330 with the surface 155. The angle 330 can be greater than ninety degrees. The angle 330 can be one hundred to one hundred and ten degrees. The angle 330 can be ninety five to one hundred and fifteen degrees. The angle 330 can be ninety to one hundred and twenty degrees. The angle 330 can be less than ninety degrees. The angle 330 can be greater than one hundred and twenty degrees.

The first side 315 and the second side 320 can meet at an area, boundary, portion, section, or edge 310. The edge 310 can be a single sharp or curved edge where the first side 315 and the second side 320 join together. The edge 310 can have a round, rounded, curved, or circular contour. The edge 310 can be a flat edge or curved edge 310. The edge 310, the first side 320, or the second side 315 can make contact with the surface 140 of the rotor 110 and electrically couple with the rotor 110 via the contact. In some cases, because the lip 120 may be angled towards the shaft end 165 only the second side 320 but not the first side 315 are in contact with the surface 140 of the cavity 135 of the rotor 110. In some cases, because the lip 120 may be angled towards the shaft end 165 only the second side 320 and the edge 310 but not the first side 315 are in contact with the surface 140 of the cavity 135 of the rotor 110.

The first side 315 can extend a distance less than the second side 320 extends. For example, the first side 315 and the second side 320 can both extend from the surface 155 of the body 170. However, because the lip 120 may be angled towards the end 165 of the shaft 105, the first side 315 can extend a first distance to the edge 310 which is less than a second distance that the second side 320 extends from the surface 155 to the edge 310. In some cases, the total surface area of the first side 315 can be less than a total surface area of the surface 320.

Figure 4:
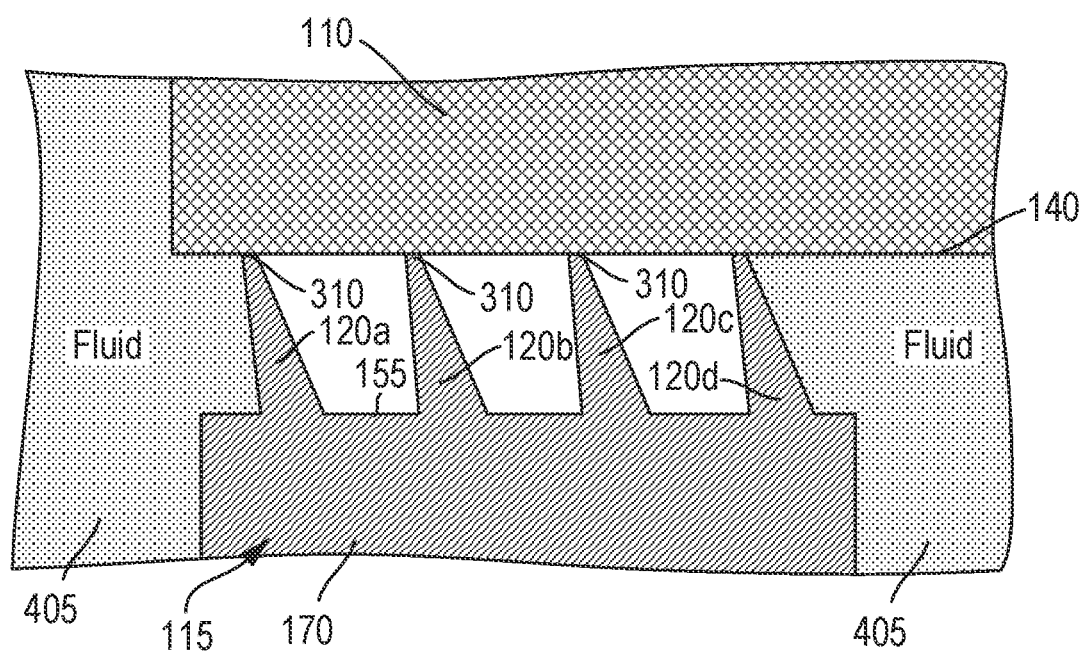
FIG. 4 is an example ring including outer lips forming a seal.

Referring to FIG. 4, among others, the ring 115 including outer lips 120 forming a seal is shown. FIG. 4 depicts a cross-sectional view of a portion of the ring 115 and a portion of the rotor 110. The lips 120 of the ring 115 can be in contact with, coupled to, or touching the surface 140 of the rotor 110. The lips 120 can apply a force against the surface 145 of the rotor 110. The surface 140 of the rotor 110 can apply a force against the surface 145. For example, the diameter 205 of the ring may be greater than an internal diameter of the cavity 135 of the rotor 110. The lips 120 can resist bending downward, applying a force equal and opposite to the force applied by surface 140 of the rotor 110.

The forces applied between the surface 140 of the rotor and the lips 120 can cause a seal to form between the lips 120 and the surface 140 of the rotor 110. For example, a seal can form between the edges 310 of the lips 120 and the surface 140 of the rotor 110. The outer lips 120 can form a seal to prevent a fluid or liquid 405 from coming into contact with the inner lips 120. For example, the motor 100 can be filled with the liquid 405 to cool internal components within the motor 100 that generate heat. For example, the liquid 405 can be a coolant, a refrigerant, or an oil. The oil can be or include a refrigerant oil, e.g., a mineral oil or a synthetic oil. The synthetic oil could be alkylbenzene, polyolester, polyalkylene glycol, polyvinyl ether. The liquid 405 may not be conductive, or may have a high resistance.

To prevent the liquid 405 from entering spaces between the inner lips 120 and the surface 140, the outer lips 120 can prevent or limit the liquid 405 from coming into the spaces between the lips 120. This can prevent the liquid from increasing the resistance between the surface 140 and the inner lips 120. For example, the inner lips 120 can be fully isolated or partially isolated from the liquid 405 of the motor 100 via the outer lips 120. For example, the spaces between the lips 120 can be free from the liquid 405, or at least partially free from the liquid 405. For example, there may be less liquid in the spaces between the lips 120 than in the rest of the motor 100. For example, there may be less liquid in the spaces between the lips 120 than on an outer side of the outer lips 120.

The inner and outer lips 120 can be formed from different materials. The materials that form the inner and outer lips 120 can be the same as or different from the material of the body 170 of the ring 115. For example, the inner lips 120 can be formed from a conductive material or a low resistance material while the outer lips 120 can be formed from a non-conductive or high resistance material. For example, the inner lips 120 can be formed from a material to form an electrical connection with the rotor 110 while the outer lips 120 can be formed from a different material (e.g., an insulator) to create a seal with the surface 140 of the rotor 110 to prevent the liquid 405 from contacting the inner lips 120. For example, the outer lips 120 can be formed from a rubber, a flexible plastic, a flexible polymer, or other material that can provide a seal or act as an insulator. The inner lips 120 can be formed from a conductive metal, a polymer, or any other conductive material.

Figure 5:
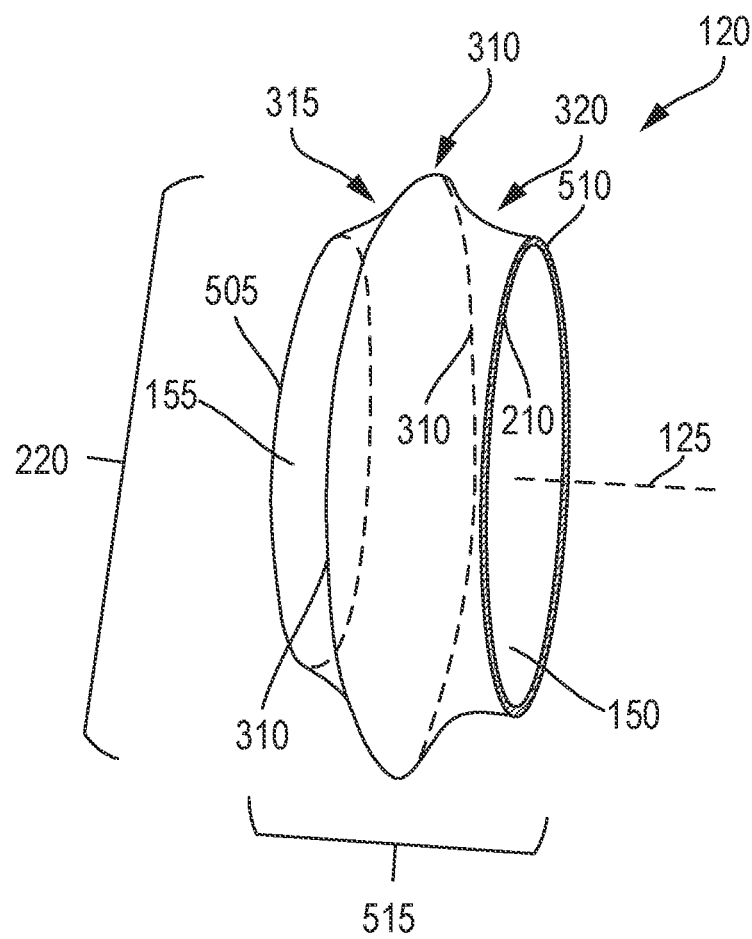
FIG. 5 is an example lip of a ring to discharge voltage from a rotor.

Referring to FIG. 5, among others, a lip 120 of a ring 115 for grounding the rotor 110 or coupling the rotor 110 to an electrical path to ground is shown. FIG. 5 depicts an isometric view of a lip 120 of the ring 115. The first side 315 and the second side 320 can be curved surfaces, sides, boundaries, or sections of the lip 120. The first side 315 can extend from a boundary, edge, a circumference, a circumferential boundary, or section 505 to the edge 310. The boundary 505 can be a circle or circular boundary centered on the longitudinal axis 125. The second side 320 can extend from a boundary, edge, or section 510 to the edge 310. The boundary 510 can be a circle or circular boundary centered on the longitudinal axis 125. The boundary 510 can be a boundary, edge, a circumference, a circumferential boundary, or a section. The edge 310 can be between the boundary 505 and the boundary 510. The boundary 505 can extend about a first point on the longitudinal axis 125. The edge 310 can extend about a second point of the longitudinal axis 125. The boundary 510 can extend about a third point on the longitudinal axis. The second point can be positioned between the first point and the second point. The edge 310 can be positioned at a point on the longitudinal axis 125 between a first point on the longitudinal axis 125 that the boundary 505 is centered on and a second point on the longitudinal axis 125 that the boundary 510 is centered on.

The surfaces 315 and 320 can be flat (e.g., as shown in FIG. 3) or curved (e.g., as shown in FIG. 5). The lip 120 can extend around the entire outer side 155 of the ring 115. The lip 120 can extend around only a portion of the outer side 155 of the ring 115. Furthermore, the edge 310 can extend around the entire outer side 155 of the ring. The edge 310 can extend around the only a portion of the outer side 155 of the ring. The edge 310 can be a circular, curved, or circumferential edge. The edge 310 can extend around the entire outer side 155 of the ring 115. The edge can extend around only a portion of the outer side 155.

The lip 120 can have a width 515. The width 515 can be a distance between the boundary 505 and the boundary 510. For example, the width 515 can be a distance between the points or circumferential boundaries where the first side 315 and the second side 320 join to the body 170. The width 515 can be between five and ten millimeters wide. The width 515 can be between two and thirteen millimeters wide. The width 515 can be less than two millimeters wide. The width 515 can be greater than thirteen millimeters wide.

Figure 6:
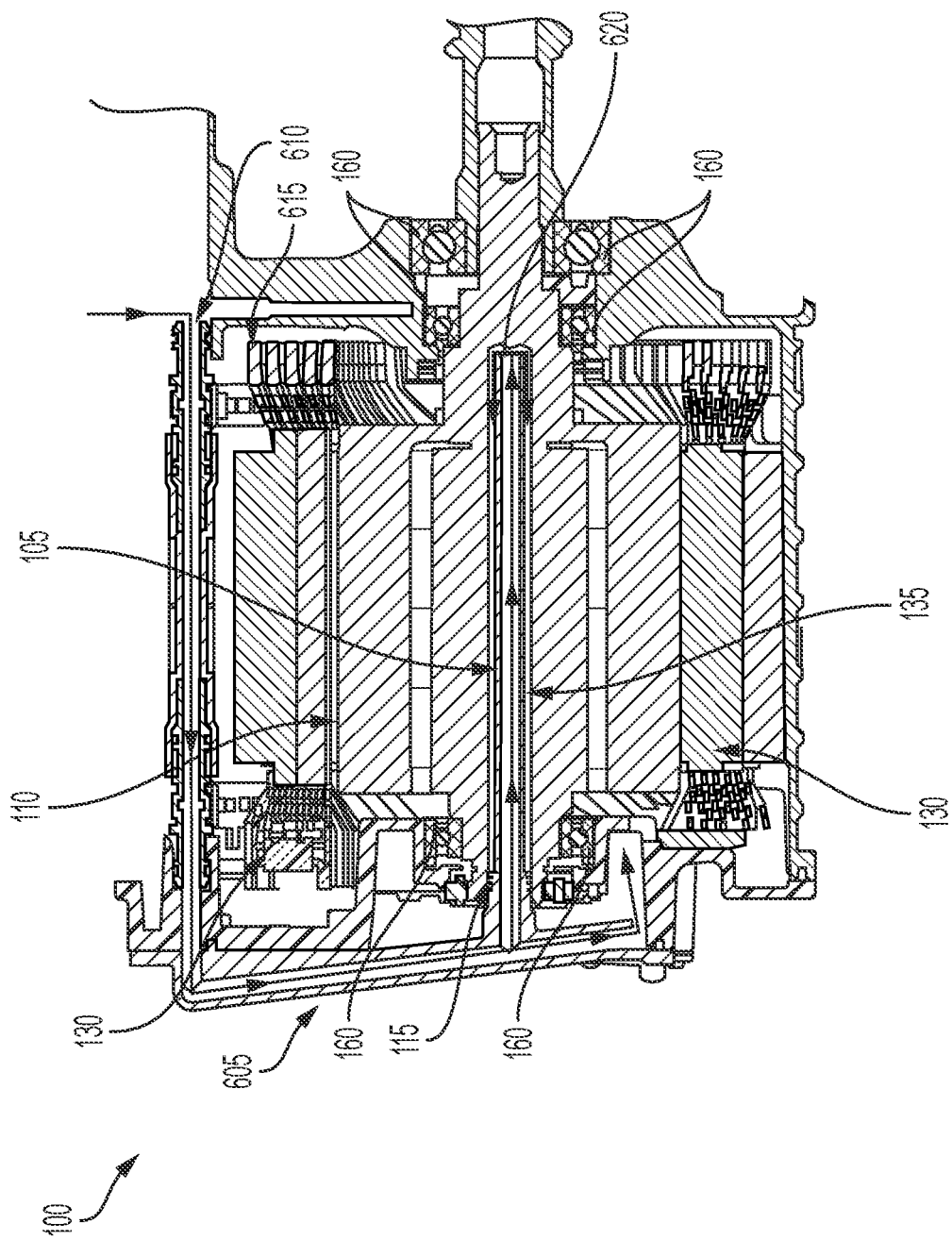
FIG. 6 is an example motor including a channel that provides liquid to the motor to cool the motor.

Referring to FIG. 6, among others, the motor 100 including a channel 610 that provides liquid to the motor 100 to cool the motor 100. FIG. 6 depicts a cross-sectional view of the motor 100. The motor 100 can include a case, enclosure, shell, or housing 605. The motor 100 can include the channel 610. The housing 605 can include the channel 610. The channel 610 can be embedded in at least one wall of the housing 605 or can be formed through at least one pipe, connector, channel, fitting, or hose. The channel 610 can deliver oil or another liquid to the motor 100. For example, shaft 105 can extend from a wall or side of the housing 605. The channel 610 can run through the wall or side of the housing 605 and extend into the shaft 105. The channel 610 can extend through the shaft 105. The rotor 110, the stator 130, housings 605, and bearings 160 to locate and support the motor 100 in a drivetrain.

The oil can move, transport, run, or flow through the channel 610 into the shaft 105 and into the cavity 135 of the rotor 110. For example, the oil can flow through the channel 610, through the shaft 105, and out through an opening of an end 620 of the shaft 105 into the cavity 135 of the rotor 110. The oil can lubricate or cool and rotor 110. Furthermore, the oil can lubricate or cool the entire inner cavity 615 of the motor. For example, the oil can coat or cover the stator 130 or any other component in the inner cavity 615. While the oil can contact, coat, or touch components in the inner cavity 615, at least one lip 120 of the ring 115 can be free, or at least partially free, of the oil. At least one lip 120 of the ring 115 can limit the amount of oil that coats, contacts, or touches at least one other lip 120 of the ring 115. By limiting the amount of oil that touches the lips 120, the lips 120 can make a reliable electrical contact with the rotor 110 and ground the rotor 110.

Figure 7:
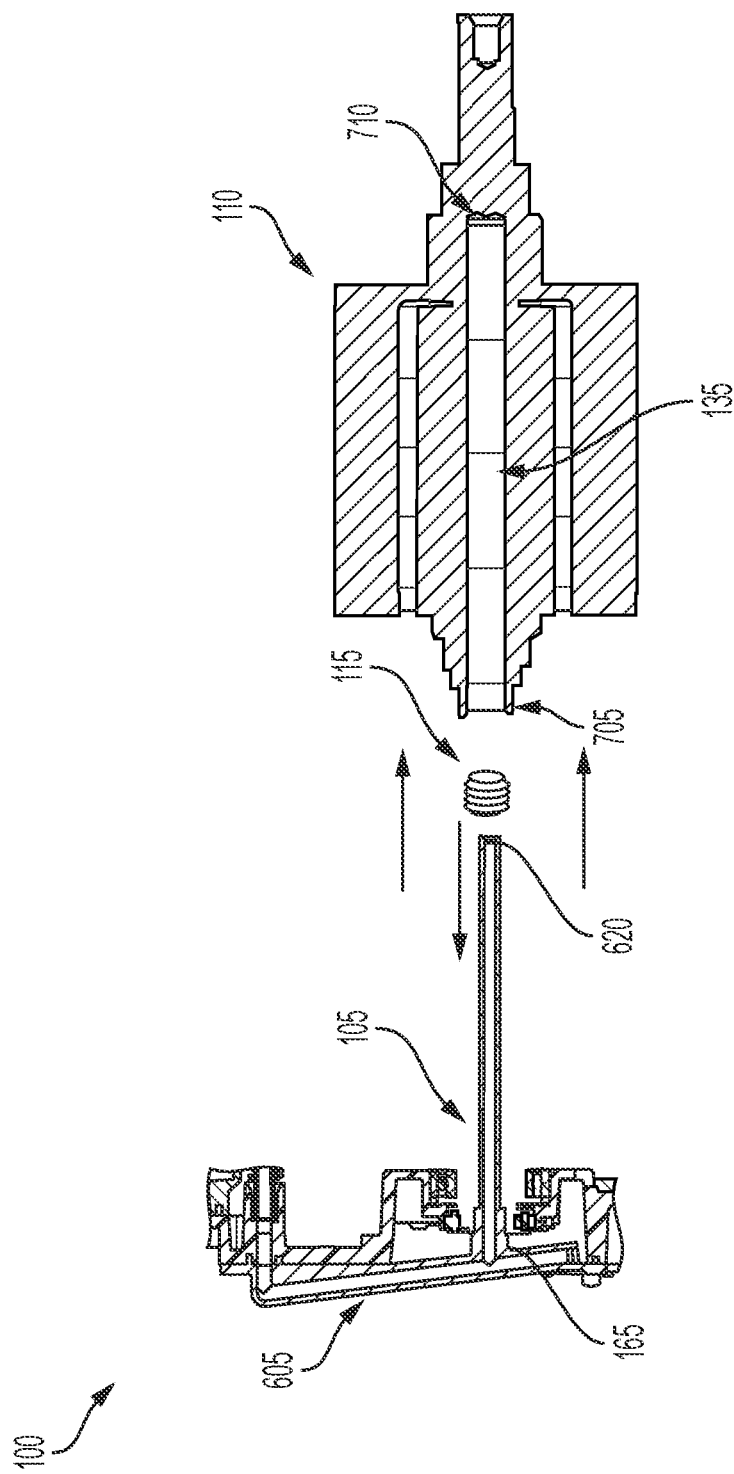
FIG. 7 is an example motor assembly in which a shaft including a ring is inserted into a rotor.

Referring to FIG. 7, among others, a motor assembly where a shaft 105 including a ring 115 is inserted into a rotor 110 is shown. FIG. 7 depicts a cross-sectional view of the shaft 105 and the rotor 110. During an assembly or manufacturing process of the motor 100, a manufacturing machine, apparatus, robotic assembly, user, technical, or person can assemble the motor 100. The housing 605, or a portion of the housing 605, can be manufactured assembled or built to include the shaft 105. The ring can be placed onto the shaft 105. The ring 115 can be slid, moved, or positioned onto the shaft 105 from an end 620 to the final position of the ring 115 on the shaft 105. The shaft 105 can be inserted into the cavity 135 of the rotor 110. The shaft 105 can be inserted into the cavity 135 of the rotor 110 after the ring 115 is disposed onto the shaft 105.

The shaft 105 can be inserted into the cavity 135 through an opening of an end 705 of the rotor 110. The shaft 105 can be inserted into the cavity 135 to an end 710 of the cavity 135. Because the lips 120 of the ring 115 are bent away from the end 705 (or towards the end 165 of the shaft 105), when the shaft 105 is inserted into the cavity 135, the lips 120 may not lose any integrity, bend, break, or snap. The lips 120 may bend further towards the end 165 or further away from the end 705.

Figure 8:
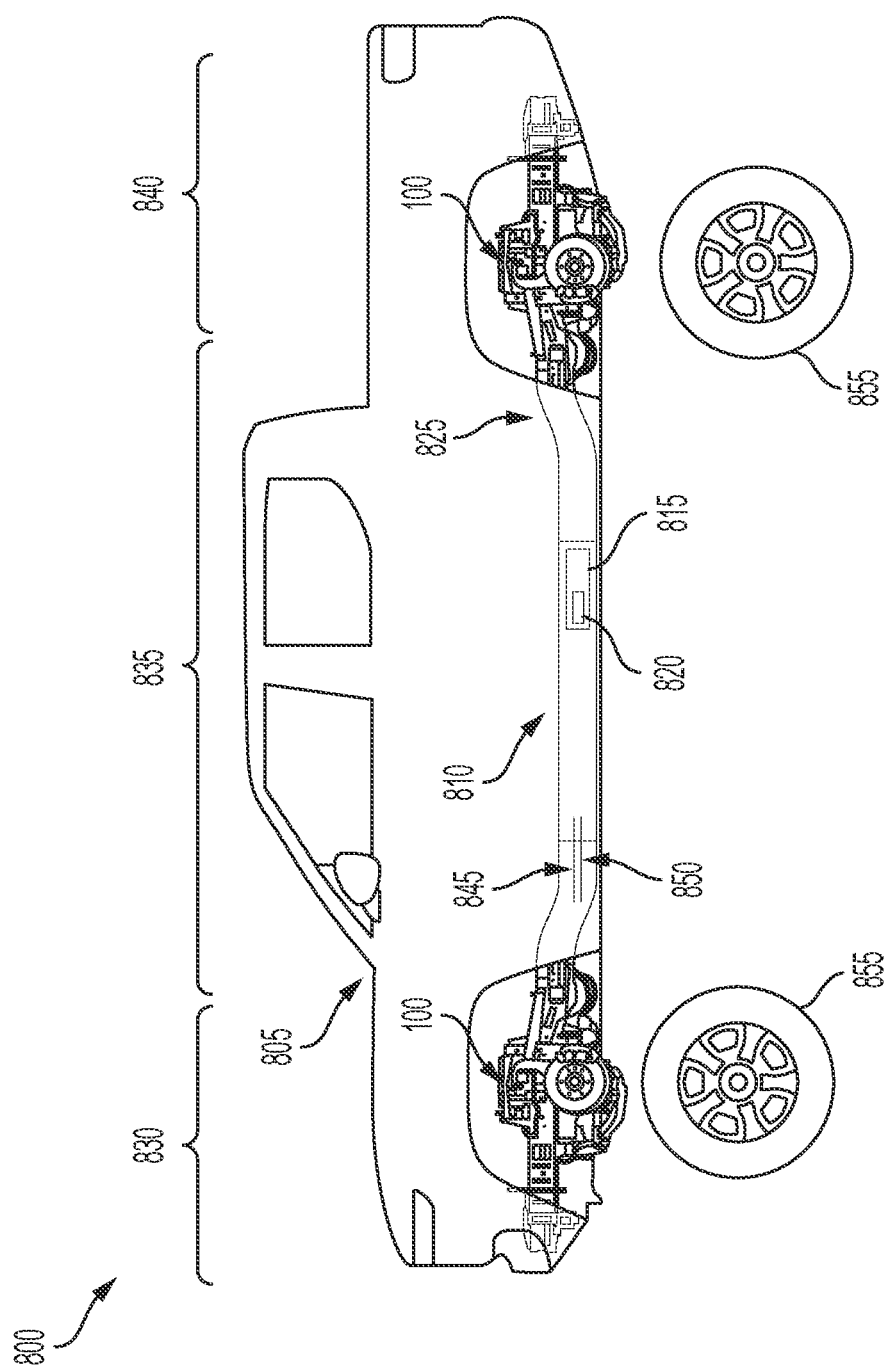
FIG. 8 is an example vehicle including motors in which the rotors of the motors are grounded via a ring.

FIG. 8 depicts an example cross-sectional view 800 of an electric vehicle 805 installed with at least one battery pack 810. Electric vehicles 805 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 810 can also be used as an energy storage system to power a building, such as a residential home or commercial building. Electric vehicles 805 can be fully electric or partially electric (e.g., plug-in hybrid) and further, electric vehicles 805 can be fully autonomous, partially autonomous, or unmanned. Electric vehicles 805 can also be human operated or non-autonomous. Electric vehicles 805 such as electric trucks or automobiles can include on-board battery packs 810, batteries 815 or battery modules 815, or battery cells 820 to power the electric vehicles 805.

The electric vehicle 805 can include a chassis 825 (e.g., a frame, internal frame, or support structure). The chassis 825 can support various components of the electric vehicle 805. The chassis 825 can span a front portion 830 (e.g., a hood or bonnet portion), a body portion 835, and a rear portion 840 (e.g., a trunk, payload, or boot portion) of the electric vehicle 805. The battery pack 810 can be installed or placed within the electric vehicle 805. For example, the battery pack 810 can be installed on or within the chassis 825 of the electric vehicle 805 within one or more of the front portion 830, the body portion 835, or the rear portion 840. The battery pack 810 can include or connect with at least one busbar, e.g., a current collector element. For example, the first busbar 845 and the second busbar 850 can include electrically conductive material to connect or otherwise electrically couple the battery 815, the battery modules 815, or the battery cells 820 with other electrical components of the electric vehicle 805 to provide electrical power to various systems or components of the electric vehicle 805.

The vehicle 805 can include at least one motor 100. For example, the vehicle 805 can include at least one motor 100 placed on, installed on, or coupled to the chassis 825 in the front portion 830 of the vehicle 805. The vehicle 805 can include at least one motor 100 placed on, installed on, or coupled to the chassis 825 in the rear portion 840 of the vehicle 805. For example, the vehicle 805 can be a dual motor vehicle 805 where a first motor 100 drives two front wheels 855 of the vehicle 805 and a second motor 100 drives two rear wheels 855 of the vehicle 805. The vehicle 805 can be a quad motor vehicle 805. The vehicle 805 can include a first motor 100 for driving a front driver side wheel 855, a second motor 100 for driving a front passenger side wheel 855, a third motor 100 for driving a rear driver side wheel 855, and a fourth motor 100 for driving a rear passenger side wheel 855.

The motors 100 can generate torque to cause the wheels 855 to spin, rotate, or transport the vehicle 805. The motors 100 can cause the vehicle 805 to drive forward, drive in reverse, turn left, turn right, or brake. Because the motors 100 each can include a stator 130 that rotates within the motor 100, each motor 100 can include the grounding ring 115 to ground the stator and prevent electric discharges that would otherwise result and degrade the performance of the motors 100.

Figure 9:
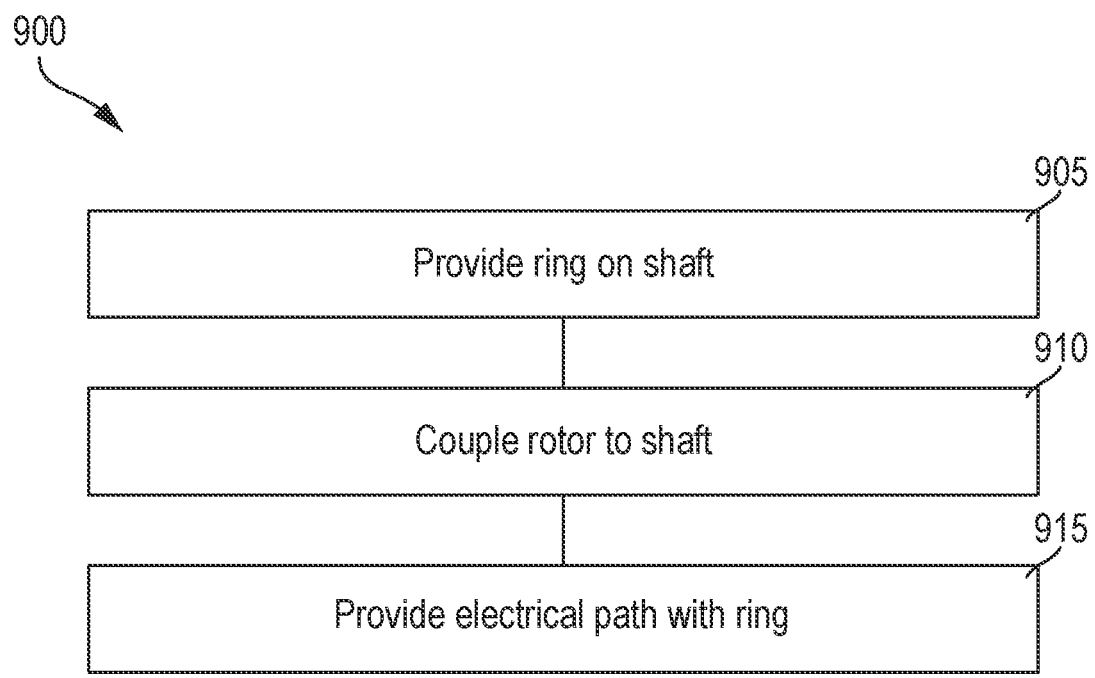
FIG. 9 is an example method of discharging voltage of a rotor of a motor with a ring.

Referring to FIG. 9, among others, a method 900 of grounding a rotor 110 of a motor 100 or providing an electrical path to ground with a ring 115 is shown. At least a portion of one ACT of the method 900 can be performed by a manufacturing or assembly apparatus. At least a portion of one ACT of the method 900 can be performed by an individual. At least a portion of one ACT of the method 900 can be performed by the motor 100, the shaft 105, the ring 115. At least a portion of one ACT of the method 900 can be performed by a vehicle 805. The method 900 can include an ACT 905 of providing a ring on a shaft. The method 900 can include an ACT 910 of coupling a rotor to the shaft. The method 900 can include an ACT 915 of providing an electrical path with the ring.

The method 900 can include an ACT 905 of providing the ring 115 on the shaft 105. The ring 115 can be placed onto the shaft 105 at an end 620. The ring 115 can be slid down the shaft 105 from the end 620 to a position at the end 620 of the shaft 105. The ring 115 can be manufactured separately from the shaft 105 and assembled with the shaft 105. The ring 115 can be manufactured on the shaft 105. For example, the ring 115 can be cast or molded directly onto the shaft 105. The ring 115 can be coupled, fixed, fixedly coupled, attached, or connected to the shaft 105. The ring 115 can be fixed to the shaft 105 through a compressing or frictional force. For example, an inner diameter of the ring 115 may be slightly smaller than an outer diameter of the shaft 105 and therefore the ring 115 may apply a compressing force on the shaft 105 to fix the ring 115 to the shaft 105. One or more nuts, washers, or bolts can fix the ring 115 to the shaft 105. An adhesive or glue can fix the ring 115 to the shaft 105. For example, an adhesive can be spread across at least a portion of the inner side 150 of the ring or on the outer surface 145 of the shaft 105. The adhesive or glue can bond the ring 115 to the shaft 105.

The method 900 can include an ACT 910 of coupling the rotor 110 to the shaft 105. The shaft 105 and the ring 115 can be inserted into the rotor 110. For example, the shaft 105 and the ring 115 can be inserted into the cavity 135 of the rotor 110. For example, after the ring 115 is fixed to the shaft 105, the shaft 105 including the ring 115 can be inserted into the cavity 135. The end 620 of the shaft 105 can be inserted through an opening of the shaft 105 into the cavity 135. The end 620 of the shaft 105 can be inserted through the cavity 135 to the end 710.

The method 900 can include an ACT 915 of providing an electrical path with the ring 115. Providing the electrical path can discharge rotor voltage from the rotor 110 with the ring 115 or ground the rotor 110. Responsive to the ring 115 being inserted into the cavity 135 of the rotor 110, the lips 120 can make contact with the inner surface 140 of the cavity 135. The lips 120 can make an electrical contact with the inner surface 140 of the rotor 110 to electrically couple the ring 115 with the rotor 110. The ring 115 can be electrically connected, electrically connected, electrically coupled, or in electrical contact with the shaft 105. The shaft 105 can be in electrical contact or electrically coupled with the housing 605 of the motor 100. The motor 100 can be fixed, coupled, or connected to the frame 825 of the vehicle 805. The frame 825 can be a ground or electrically neutral component of the vehicle 805. The ring 115 can ground the rotor 110 through the shaft 105, the housing 605, and the frame 825. For example, the ring 115 can provide an electrical path from the rotor 110 to the frame 825 to ground the rotor 110. Providing the electrical path can include connecting the shaft 105 to a ground via the ring 115. Providing the electrical path via the ring 115 can include installing the motor 100 on a frame 825 of the vehicle 805.

Figure 10:
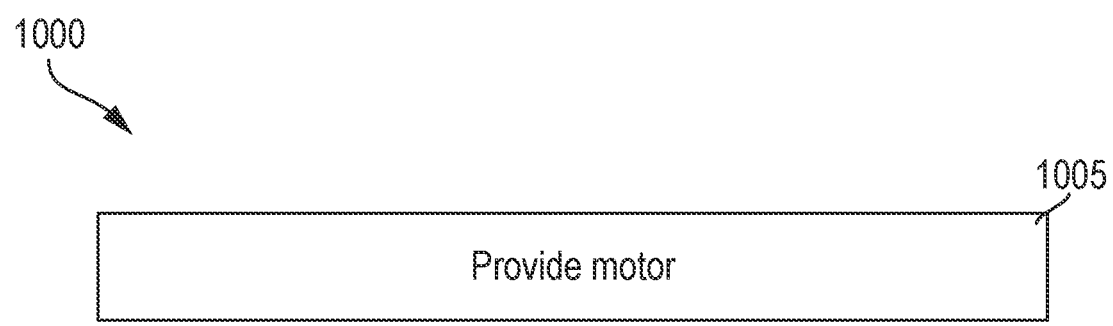
FIG. 10 is an example method of providing a motor.

Referring to FIG. 10, among others, a method 1000 of providing a motor 100 is shown. At least a portion of one ACT of the method 1000 can be performed by a manufacturing or assembly apparatus. At least a portion of one ACT of the method 1000 can be performed by a manufacturing or assembly individual. At least a portion of one ACT of the method 1000 can be performed by the motor 100, the shaft 105, or the ring 115. The method 1000 can include an ACT 1005 of providing a motor. The method 1000 can include providing the motor 100. The method 1000 can include providing the motor 100 including the ring 115.

The ring 115 can be disposed on a shaft 105. For example, the ring 115 can be disposed completely or partially on the shaft 105. The ring 115 can be disposed on the shaft 105 in a position where the ring 115 is at least partially disposed within the cavity 135 of the rotor 110. For example, the ring 115 can be disposed on a portion of the shaft 105 that is at least partially disposed within the cavity 135. The ring 115 can include at least one lip 120. The lips 120 can extend from a surface 155 of the ring 115 and contact an inner surface 140 of the cavity 135. The lips 120 can extend fully or partially around an outer circumference 205 of the ring 115. For example, each lip 120 can include a first side 315 and a second side 320 that extend from a surface 155 of the ring 115. The first side 315 and the second side 320 can meet at an edge 310. The edge 310, the first side 315, or the second side 320 of the lips 120 can contact, electrically contact, or electrically couple with the surface 140 of the cavity 135. The edge 310 can contact the surface 140 around a rounded contour of the edge 310.

The ring 115 can include multiple lips 120. At least one lip 120 can create a seal between the lip 120 and the surface 140 of the cavity 135 to limit, prevent, or restrict the flow or movement of fluid within the cavity 135. For example, two or more outer lips 120 can limit the amount of fluid that comes into contact with inner lips 120. The inner lips 120 may remain free, or at least partially free, of the fluid and make an electrical contact with the inner surface 140 of the cavity 135. The lips 120 can be angled. For example, the lips 120 can be angled towards the end 165 of the shaft 105. The lips 120 can be angled away from the rotor 110. The lips 120 can be angled away from the end 620 of the shaft 105. The lips 120 can be angled away from a direction in which the ring 115 is inserted into the cavity 135 of the shaft 105. For example, the ring 115 can be inserted in a direction from the end 620 towards the end 165. The lips 120 can be angled away from a direction in which the shaft 105 is inserted into the cavity 135. For example, the shaft 105 can be inserted into the cavity 135 in a direction from the opening 705 towards the end 710.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

In some examples, the ring including the lips can be used in any other type of liquid or oil cooled environment, not limited to motors. For example, in a driveline, a clutch, or any other apparatus with rotating components, a voltage may build up over time. The grounding ring described herein can ground the components, even if the components are liquid or oil cooled. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to control rotor voltage in a motor, comprising:
   a rotor;
   a shaft; and
   a ring disposed on the shaft, the ring comprising:
      a first lip in contact with an inner surface of the rotor; and
      a second lip in contact with the inner surface of the rotor and a cooling liquid;
   the first lip providing an electrical path to discharge a voltage from the rotor, and the second lip providing a seal between the first lip and the cooling liquid;
   wherein the first lip and the second lip are formed from different materials, wherein the first lip is formed from a conductive material to provide the electrical path, and the second lip is formed from a flexible insulating material to form the seal.

2. The system of claim 1, comprising:
   the first lip positioned on the shaft a first distance from an end of the shaft;
   the second lip positioned on the shaft a second distance from the end of the shaft less than the first distance; and
   a third lip positioned on the shaft a third distance from the end of the shaft greater than the first distance, the third lip providing a second seal between the first lip and the cooling liquid.

3. The system of claim 1, comprising:
   the ring comprising:
      a body with a cylindrical shape comprising:
         an inner side in contact with the shaft; and
         an outer side, the first lip and the second lip extending from the outer side to the inner surface of the rotor.

4. The system of claim 1, comprising:
   the first lip and the second lip extending from an outer surface of the ring at an acute angle towards an end of the shaft.

5. The system of claim 1, comprising:
   the first lip and the second lip extending from an outer surface of the ring at an acute angle in a direction away from a direction of insertion of the shaft into the rotor during assembly of the motor.

6. The system of claim 1, comprising:
   the rotor comprising a cavity including a cylindrical shape; and
   the ring positioned on the shaft within the cavity of the rotor.

7. The system of claim 1, comprising:
   the first lip comprising an edge having a rounded contour that extends around a circumference of the ring; and
   the edge of the first lip contacting the inner surface of the rotor around a circumference of a cylindrical shaped cavity of the rotor.

8. The system of claim 1, comprising:
   the first lip comprising:
      a first side extending from a first circumferential boundary to an edge;
      the first circumferential boundary extending about a first point on a longitudinal axis of the ring,
      the edge extending about a second point on the longitudinal axis, the second point between the first point and a third point on the longitudinal axis, the edge to contact the inner surface of the rotor;
      a second circumferential boundary extending about the third point; and
      a second side extending from the second circumferential boundary of the ring to the edge.

9. The system of claim 1, comprising:
   a body of the ring comprising the conductive material to electrically couple the inner surface of the rotor with the shaft.

10. An apparatus, comprising:
    a body with a cylindrical shape disposed on a shaft within a rotor of a motor,
    a first lip in contact with an inner surface of the rotor; and
    a second lip in contact with the inner surface of the rotor and a cooling liquid;
    the first lip providing an electrical path to discharge a voltage from the rotor, and the second lip providing a seal between the first lip and the cooling liquid;
    wherein the first lip and the second lip are formed from different materials, wherein the first lip is formed from a conductive material to provide the electrical path, and the second lip is formed from a flexible insulating material to form the seal.

11. The apparatus of claim 10, comprising:
    the body, comprising:
       an inner side in contact with the shaft; and
       an outer side, the first lip and the second lip extending from the outer side to the inner surface of the rotor.

12. The apparatus of claim 10, comprising:
    the first lip and the second lip extending from an outer surface of the apparatus at an acute angle towards an end of the shaft.

13. The apparatus of claim 10, comprising:
    the first lip and the second lip extending from an outer surface of the apparatus at an acute angle in a direction away from a direction of insertion of the shaft into the rotor during assembly of the motor.

14. The apparatus of claim 10, comprising:
    the first lip comprising an edge having a rounded contour that extends around a circumference of the apparatus; and
    the edge of the first lip contacting the inner surface of the rotor around a circumference of a cylindrical shaped cavity of the rotor.

15. The apparatus of claim 10, comprising:
    the first lip comprising:
       a first side extending from a first circumferential boundary to an edge;
       the first circumferential boundary extending about a first point on a longitudinal axis of the apparatus;
       the edge extending about a second point on the longitudinal axis, the second point between the first point and a third point on the longitudinal axis, the edge to contact the inner surface of the rotor;
       a second circumferential boundary extending about the third point; and
       a second side extending from the second circumferential boundary of the apparatus to the edge.

16. The apparatus of claim 10, comprising:
    the body of the apparatus comprising the conductive material to electrically couple the inner surface of the rotor with the shaft.

17. The apparatus of claim 10, wherein:
    the apparatus is positioned on the shaft within a cavity of the rotor, the cavity including a cylindrical shape.

18. A method, comprising:

disposing a ring around a shaft;

inserting the shaft into a cavity of a rotor;

discharging a voltage from the rotor by a first lip of the ring in contact with an inner surface of the rotor, the first lip providing an electrical path to discharge the voltage; and providing a seal between the first lip and a cooling liquid with a second lip in contact with the inner surface of the rotor;

wherein the first lip and the second lip are formed from different materials, wherein the first lip is formed from a conductive material to provide the electrical path, and the second lip is formed from a flexible insulating material to form the seal.

19. The method of claim 18, comprising:

positioning the ring on the shaft at a position; and inserting an end of the shaft through an opening of the ring, wherein the ring is completely disposed within the cavity of the rotor at the position.

20. The method of claim 18, comprising:

disposing the first lip on the shaft a first distance from an end of the shaft;

disposing the second lip on the shaft a second distance from the end of the shaft less than the first distance; and disposing a third lip on the shaft a third distance from the end of the shaft greater than the first distance, the third lip to provide a second seal between the first lip and the cooling liquid.

* * * * *